United States Patent
Milstein et al.

(10) Patent No.: US 9,667,793 B2
(45) Date of Patent: *May 30, 2017

(54) SYSTEM AND METHOD FOR PROVIDING ONGOING CALL CENTER CALL ASSISTANCE WITH THE AID OF A DIGITAL COMPUTER

(71) Applicant: Intellisist, Inc., Seattle, WA (US)

(72) Inventors: David Milstein, Redmond, WA (US); Gilad Odinak, Bellevue, WA (US); Howard M. Lee, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,391

(22) Filed: Jul. 11, 2016

(65) Prior Publication Data

US 2016/0323451 A1 Nov. 3, 2016

Related U.S. Application Data

(63) Continuation of application No. 14/668,806, filed on Mar. 25, 2015, now Pat. No. 9,392,117.

(60) Provisional application No. 61/972,150, filed on Mar. 28, 2014.

(51) Int. Cl.
| | |
|---|---|
| *H04M 3/00* | (2006.01) |
| *H04M 5/00* | (2006.01) |
| *H04M 3/51* | (2006.01) |
| *G06Q 10/10* | (2012.01) |
| *H04M 3/523* | (2006.01) |
| *G10L 25/87* | (2013.01) |
| *H04M 3/42* | (2006.01) |

(Continued)

(52) U.S. Cl.
CPC ...... *H04M 3/5191* (2013.01); *G06Q 10/1097* (2013.01); *G10L 25/87* (2013.01); *H04M 3/42221* (2013.01); *H04M 3/5166* (2013.01); *H04M 3/5175* (2013.01); *H04M 3/5233* (2013.01); *H04M 3/56* (2013.01); *G10L 2015/088* (2013.01); *H04M 2201/40* (2013.01)

(58) Field of Classification Search
USPC ........................................ 379/265.12, 203.01
See application file for complete search history.

(56) References Cited

U.S. PATENT DOCUMENTS 6,868,154 B1 * 3/2005 Stuart ................. H04M 3/5175
379/265.07

* cited by examiner

*Primary Examiner* — Quynh Nguyen
(74) *Attorney, Agent, or Firm* — Patrick J. S. Inouye; Leonid Kisselev; Krista A. Wittman

(57) ABSTRACT

A system and method for providing ongoing call center call assistance with the aid of a digital computer is provided. A call is received from a caller by an automatic call distributor in a call center and the caller is connected by the automatic call distributor to an agent of the call center. The agent's speech during the call is monitored by an intervention processor included in the call center. The intervention processor determines speech characteristics of the agent during the call, obtains predetermined speech characteristics for the agent, compares the predetermined speech characteristics to the speech characteristics determined during the call, and detects the agent being in need of assistance based on the comparison. The automatic call distributor determines a subject matter of the call and the intervention processor identifies an expert whose expertise matches the subject matter. The intervention processor patches the expert into the call.

20 Claims, 6 Drawing Sheets

(51) Int. Cl.
*H04M 3/56* (2006.01)
*G10L 15/08* (2006.01)

40

60

70

SYSTEM AND METHOD FOR PROVIDING ONGOING CALL CENTER CALL ASSISTANCE WITH THE AID OF A DIGITAL COMPUTER

CROSS-REFERENCE TO RELATED APPLICATION

This non-provisional patent application is a continuation of U.S. patent application, Ser. No. 14/668,806, filed Mar. 25, 2015, pending, which claims priority under 35 U.S.C. §119(e) to U.S. Provisional Patent application, Ser. No. 61/972,150, filed Mar. 28, 2014, the disclosures of which are incorporated by reference.

FIELD

This application relates in general to contact centers and, in particular, to a system and method for providing ongoing call center call assistance with the aid of a digital computer.

BACKGROUND

Customer call centers, or simply, "call centers," are often the first point of contact for customers seeking direct assistance from manufacturers and service vendors. Call centers provide customer support and problem resolution reachable by telephone, including data network-based telephone services, such as Voice-Over-Internet Protocol (VoIP), or by a Web application that allows customers to make calls. Although World Wide Web- and email-based customer support are becoming increasingly available, call centers still offer a convenient and universally-accessible forum for remote customer assistance. The timeliness and quality of service provided by call centers is critical to ensuring customer satisfaction. Minimizing delays is crucial, even when caller volume is high.

To provide satisfactory customer service to all the customers, a call center must be equipped with well-trained agents to handle many types of calls in different subject matter. However, training agents can be costly and limited. Thus, conventional current call centers tend to encounter problems including identifying an available agent who can handle the customer specific question or obtaining the requested information from specialized employees, such as supervisors. Meanwhile, customers may remain in a call queue. Such a long hold time or frequent interruption of the call eventually lowers a level of customer satisfaction.

Specifically, conventional call center routing systems, such as Avaya Call Center Automatic Call Distributor, provided by Avaya Inc., Basking Ridge, N.J., uses a type-in extension number to reach to an agent in the call center. To add other participants, the call must first put into a hold while the other participant is added on a separate line, and then the two lines must be joined as a conference. Such a system is not designed to directly integrate multiple inputs in-band without interruption and use of a separate line. Thus, using the Avaya system, when an agent needs further information to answer a caller's question or solve the caller's issue, the information can be provided to the agent by speaking with a supervisory agent on a separate line while placing the caller in a queue as the traditional system is not designed to support integration of real-time inputs in-band. Further, such a system is time consuming as the system keeps a customer on hold.

Accordingly, there is a need for providing call assistance at a best time for an agent who is on an on-going call without interrupting the call between the agent and a caller.

SUMMARY

A just-in-time in-band expert intervention system is interconnected with an Automatic Call Distributor (ACD). When an incoming call from a caller is received by the system, the ACD prompts a series of questions to the caller to collect information regarding the call and caller. Once the ACD identifies subject matter of the call, the ACD distributes the call to an agent who has an appropriate skill set to handle the subject matter of the call.

One embodiment provides a system and method for providing ongoing call center call assistance with the aid of a digital computer. A call is received from a caller by an automatic call distributor in a call center and the caller is connected by the automatic call distributor to an agent of the call center. The agent's speech during the call is monitored by an intervention processor included in the call center. The intervention processor determines speech characteristics of the agent during the call, obtains predetermined speech characteristics for the agent, compares the predetermined speech characteristics to the speech characteristics determined during the call, and detects the agent being in need of assistance based on the comparison. The automatic call distributor determines a subject matter of the call and the intervention processor identifies one of a plurality of experts whose expertise matches the subject matter of the call. The intervention processor patches the expert into the call.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
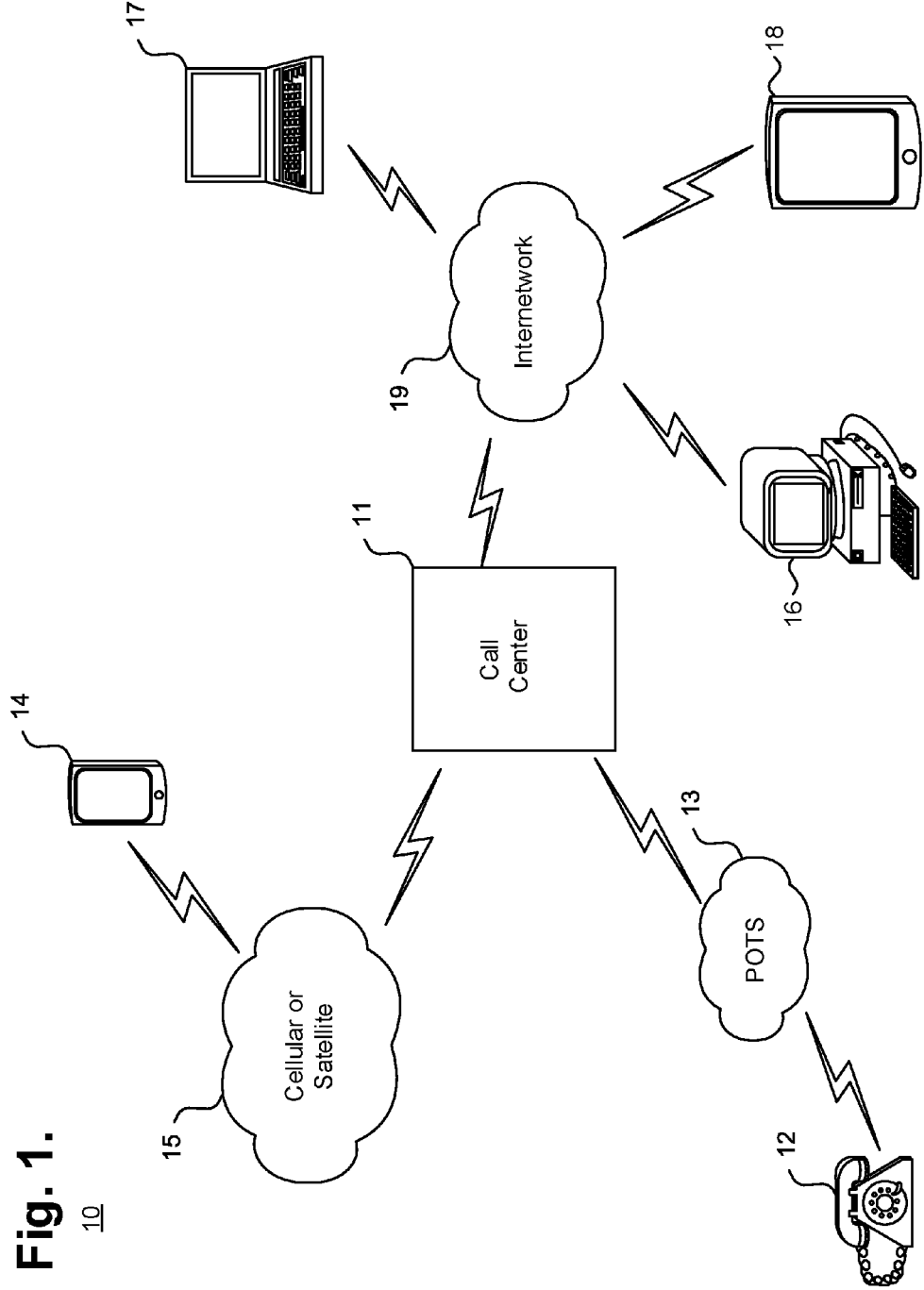
FIG. 1 is a functional block diagram showing an environment for managing call center communications, in accordance with one embodiment.

Call centers generally process customer service communication using a combination of an ACD to collect information from a caller and to distribute the call to a live agent based on subject matter of the call for handling the call with the caller. FIG. 1 is a functional block diagram showing an environment 10 for managing call center communications, in accordance with one embodiment. The call center 11 receives incoming calls from conventional telephone handsets 12 through Plain Old Telephone Service (POTS) 13 and from portable handsets 14 through cellular and satellite telephone service 15. Calls can also be received from desktop 16, portable 17 or tablet 18 computers, including VoIP clients, Internet clients, and Internet telephony clients, through an internetwork 19, such as the Internet. In one embodiment, a call can be initiated through a Web application, such as on a smart phone, tablet, or other types of computing device. Thus, the forms of customer service communication may include calls, text messages, instant messages, emails, and video conferencing. Other forms of communication are possible.

The handsets 12, 14, computers 16-18, and the call center 11, each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible. Other call center arrangements and configurations are possible. Except as otherwise stated, as used herein, the terms "caller," "user," and "customer" are used interchangeably to refer to a caller to the call center 11. Similarly, the terms "agent," "guide," and "operator" are used interchangeably to refer to an agent that provides service provisioning to the caller to the call center 11.

Expert Intervention System

Figure 2:
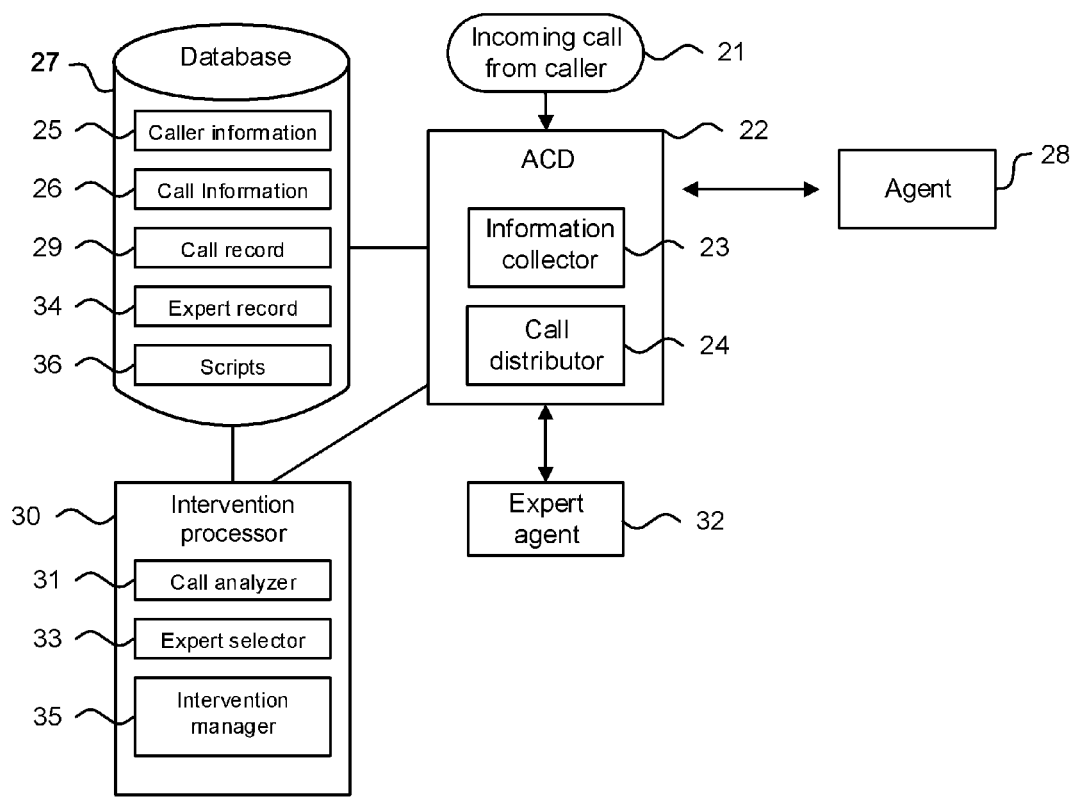
FIG. 2 is a functional block diagram showing a call center for optimizing customer experience through in-band expert intervention, in accordance with one embodiment.

Once a call is received in the call center, each call is assigned to an agent to address any concerns of the caller. If the assigned agent is unable to assist the caller, an expert agent can join the call. FIG. 2 is a functional block diagram showing a call center 20 for optimizing customer experience through in-band expert intervention, in accordance with one embodiment. Calls 21 are received into the call center 20 by an ACD 22 through a Private Branch Exchange (not shown) or other telephonic connection for distribution. The ACD 22 includes an information collector 23 and call distributor 24. The information collector 23 obtains information from a caller of each received call based on the caller's responses as a series of scripts 36 provided by the ACD 22. The collected information 36 can be stored in a database 27 interconnected to the ACD 22 and can include data regarding the caller 25 and call 26. The information regarding the caller 25 can include the caller's name, telephone number, email address, gender, account number, and caller identification. Other information regarding the caller is possible. The information regarding the call 26 can include subject matter of the call and date and time of the call. Other information regarding the call is possible. Subsequently, the call distributor 24 assigns each received incoming call to an agent 28.

The agents 28 are live individuals who answer and handle calls 21 within a call center 20 to enable information collection and trouble-shooting on behalf of the customers or callers. The call distributor 24 assigns a call 21 to one of the agents 28 based on agent selection criteria, which can include an agent's skill level, seniority, availability, mood or health condition, and a percentage of success of handling each subject matter. Specifically, the information collected from the caller can be used to determine an appropriate agent for handling the call 21. Criteria for the appropriate agent are determined and applied to a profile of each agent. The agent with the profile most similar to the agent criteria is selected. For example, a caller with a complicated technical question may be transferred to a senior agent who is available and has a high skill level in dealing with such a question. Other agent selection criteria are possible. The ACD 22 can also identify a particular agent that shares common characteristics with a caller for transferring the call, as described in commonly-assigned U.S. Pat. No. 8,837,687, to Odinak, issued on Sep. 16, 2014, the disclosure of which is hereby incorporated by reference. For instance, the characteristics can include gender, age, nationality, ethnicity, and accent. Other characteristics are possible.

Once a call 21 is assigned to an agent 28, the call 21 is recorded in a call record 29. The ACD 22 is interconnected to the database 27 and continuously stores the recording of the call 29 between the agent 28 and the caller. An intervention processor 30 is interconnected to the database 27. The call records 29 stored in the database 27 can be accessed by a call analyzer 31. In one embodiment, the call analyzer 31 analyzes speech utterances of the agent 28 and the caller, metrics of the call, and previous call history of the caller, such as on a continuous basis. Other areas for call analysis by the call analyzer 31 are possible.

During monitoring of the call, the call analyzer 31 can detect an event indicating that the agent is in need of help to address an inquiry of the caller. Such an event can include a long pause by the agent 28 during the conversation with the caller 21 and a length of the call that is longer than an average call. Other events are possible. The event indicating necessity of call help is further described below with reference to FIG. 4. After detecting such an event, an expert selector 33 appoints an expert agent 32 who has an expert level of skills and knowledge in regard with the caller inquiry. For example, an agent 28 focuses on general billing encounters a question from a caller regarding credit cards can call for a help from an expert agent 32 who has a skill and knowledge in billing and credit cards or the need for assistance can be automatically detected based on an event. Other expert levels of skills and knowledge are possible. The expert agent selection criteria are further described infra with reference to FIG. 5.

Once an expert agent 32 is selected, an intervention manager 35 patches the expert agent 32 into the call 21. The in-band expert intervention by the expert agent 32 is further described infra with reference to FIG. 6.

The ACD 22 and intervention processor 30 can include components conventionally found in general purpose programmable computing devices, such as a central processing unit, memory, input/output ports, network interfaces, and non-volatile storage and also include one or more modules for carrying out the embodiments disclosed below. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components, and the ACD 22 and intervention processor 30 can act as a specialized computer. For instance, when the modules are implemented as hardware, that particular hardware is specialized to perform the content monitoring, event detection, and message delivery and other computers cannot be used. Additionally, when the modules are burned into read-only memory components, the ACD 22 and intervention processor 30 storing the read-only memory becomes specialized to perform the monitoring, detection, and delivery that other computers cannot. Other types of specialized computers on which the modules could be implemented are also possible. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Expert Intervention Method

Figure 3:
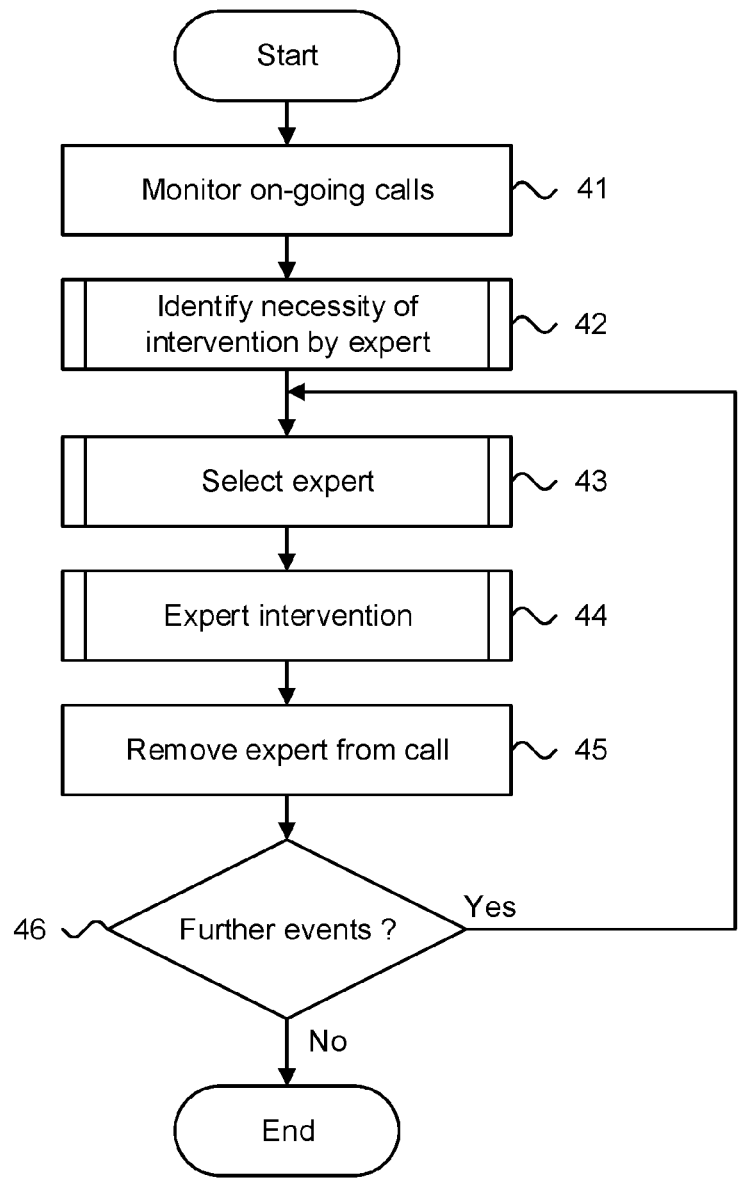
FIG. 3 is a flow diagram showing a process for optimizing customer experience through in-band expert intervention, in accordance with one embodiment.

Providing in-band intervention by an expert agent directly into an on-going call between an agent and a caller prevents a need to place the caller in a queue while the agent is searching for a solution to the customer's unsolved issues. FIG. 3 is a flow diagram showing a process 40 for optimizing customer experience through in-band expert intervention, in accordance with one embodiment. The process 40 is performed as a series of process steps by the in-band expert intervention system and other computing devices.

An incoming call from a caller is received in a call center and assigned to an agent based on subject matter of the call. The agent can be selected using the agent selection criteria, including an agent's skill level, knowledge, ranking, and a percentage of success of handling each subject matter. Other agent selection criteria are possible.

A call between the agent and the caller is monitored and recorded during the call (step 41). The recording can be stored in an agent database for access at a later time. During the call monitoring, an event indicating that the agent needs help is identified (step 42), as further described infra with reference to FIG. 4. An expert agent with an appropriate skill level to assist the agent is selected from a list of agents (step 43), as further described infra with reference to FIG. 5. Then, the selected expert agent is patched directly to the call without utilizing a separate line (step 44), as further described infra with reference to FIG. 6.

Once the customer's issue has been resolved by the expert agent, the expert agent is dispatched or removed from the call (step 45). When further subject matter is identified, for each subject matter by the ACD, steps 41-45 are repeated for each subject matter until all the subject matter of the caller's issues are solved (step 46).

Identifying an Event of Expert Intervention Necessity

Figure 4:
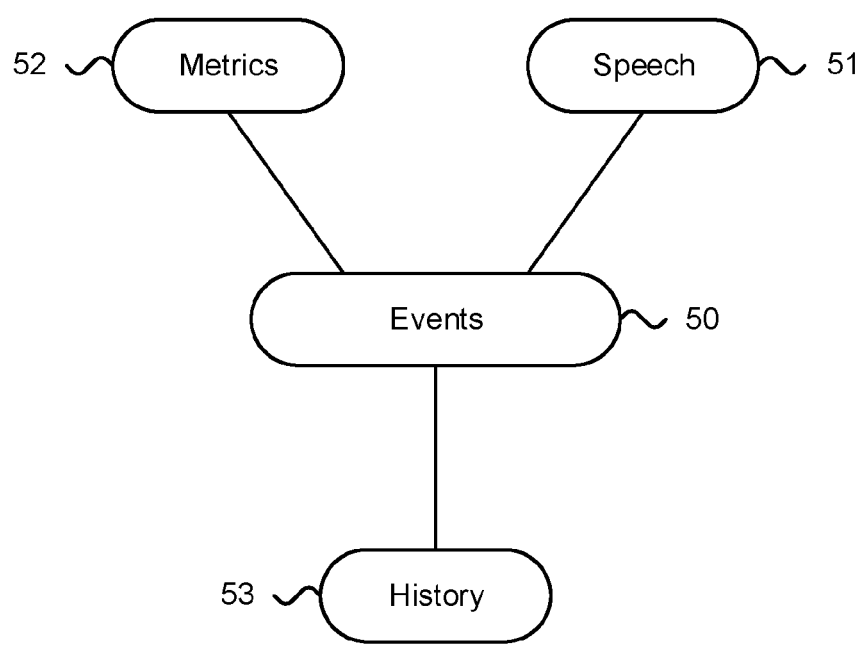
FIG. 4 is a functional block diagram showing events for identifying a need for in-band expert intervention, in accordance with one embodiment.

By identifying the necessity of expert assistance in real-time, the in-band expert intervention system can provide just-in-time customer service. FIG. 4 is a functional block diagram showing events 50 for identifying a need for in-band expert intervention, in accordance with one embodiment.

An on-going conversation between the agent and caller is continuously recorded during the call for monitoring and identifying an event showing that the agent is in need of assistance. The assistance can be provided as an intervention by an expert agent. The conversation is segmented into several components for identifying whether an event has occurred. The event can be identified by analyzing speech utterances 51 of the agent and the caller during the call, call metrics of the call 52, or a previous call history of the caller 53.

The speech utterances 51 can be analyzed to determine the agent's hesitation to speak, slow or fast speech, high or low voice pitch, and intervals between speeches. In one embodiment, a record associated with the agent can include the agent's normal speech characteristics, and the current speech utterance may be compared with the agent's normal speech characteristics. For example, during the conversation, a pause of twelve seconds between an end of the earlier inquiry and the agent's response is identified as an event necessitating help. The speech characteristics can include speed, loudness, and intensity of overtone. For instance, if the speech utterances of the caller are louder than average or above a threshold, a determination can be made that the caller is not satisfied or intervention by an agent with higher skill may be needed to satisfy the customer. Other forms of speech characteristics are possible. The metrics of the call 52 can include a length, date, or time of the call, and a location of the caller. For instance, a call session lasting longer than an average call, such as ten minutes, can indicate a possibility that the agent is not understanding the caller's issues and not providing a proper solution to the caller's concern. Other types of call metrics are possible. The caller's previous call history 53 may also provide an indication that expert intervention is necessary. The call history can include information about the caller, such as temper, average time spend in previous calls, willingness to be put on hold as well as other information. Based on the history, expert intervention can occur when an event identified by the history has occurred. For example, when the previous call history of the caller shows that the caller usually stay on a call for seven minutes and the time of the current call is at six minutes and thirty seconds, an event can be identified and expert intervention can be triggered. Other examples of call history characteristics are possible. Once the necessity of expert intervention is identified, an appropriate expert agent is selected for providing assistance to the caller in the on-going call in addition to or in lieu of the agent who is on the on-going call with the caller.

Selecting an Expert Agent

Figure 5:
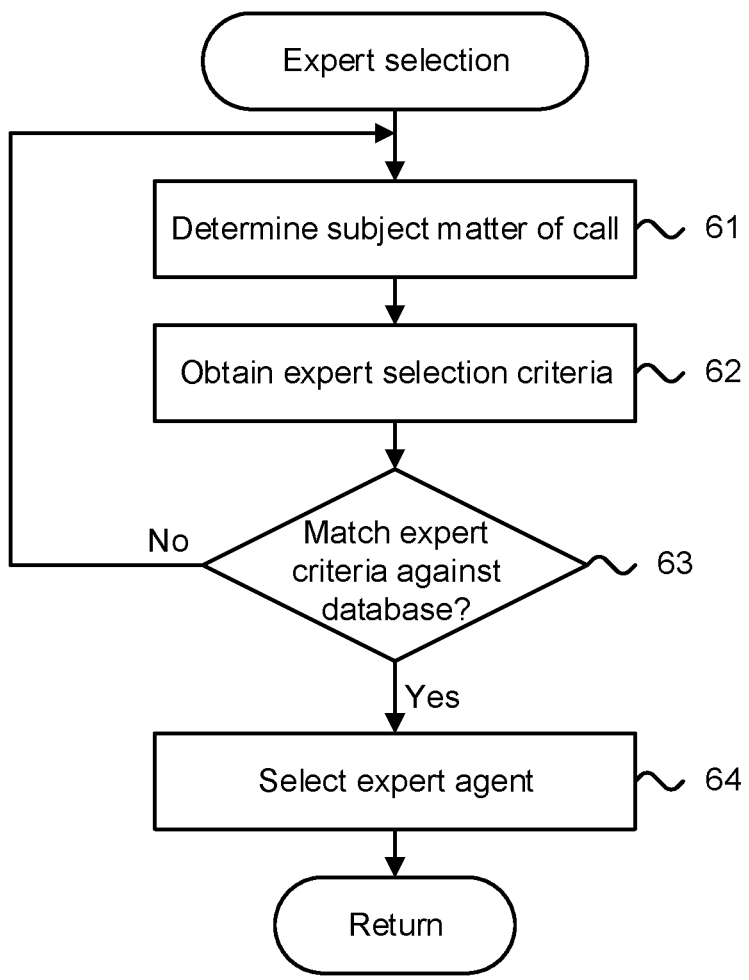
FIG. 5 is a flow diagram showing, by way of example, a method for selecting an appropriate expert agent.

Each expert agent is selected from a pool of expert agents who handle different categories of subject matter. FIG. 5 is a flow diagram showing, by way of example, a method 60 for selecting an appropriate expert agent. A subject matter of the call is initially identified by the ACD, as discussed supra, and which can be continuously updated during the real-time conversation between the agent and the caller (step 61). In one embodiment, the subject matter from the on-going call can be identified based on a speech recognition system by characteristic words in the speech of the agent and the caller, as described in commonly-assigned U.S. Pat. No. 8,462,935, to Odinak, issued on Jun. 11, 2013, the disclosure which is hereby incorporated by reference. For example, a customer service call center for a department store may recognize characteristic words, such as "dress," "wrong color," "delivered," and identify the subject matter as a delivery of a dress with a wrong color. Other forms of identification are possible.

Once the subject matter of the call by the caller is identified, expert selection criteria are obtained (step 62). The expert selection criteria specify a skill level and knowledge of the expert agent, which are essential for providing expertise for resolving inquiries of a particular subject matter. The expert selection criteria can include the expert's skill level, knowledge, and success rate of handling calls regarding a particular subject matter based on the expert's past call history in comparison with other experts that handle calls of the same subject matter, seniority, and ranking. Other forms of expert selection criteria are possible. The expert selection criteria may be organized in a spreadsheet and stored in the agent record in the database.

The expert selection criteria are compared to a list of all the expert agents (step 63). Each expert agent profile contains personal data, such as a skill level, knowledge, seniority, ranking, success rate of handling a particular subject matter, as well as age, gender, language skill, current mood or health condition, and availability of each agent to handle the call. Among those personal data, the expert agent's availability can be checked first. The availability of the agent can be determined, as described in commonly-assigned U.S. patent application, Ser. No. 13/802,710 to Odinak, filed on Mar. 14, 2013, pending, the disclosure which is hereby incorporated by reference. If the expert selection criteria matches with at least one of the expert agent's personal data, the matched expert agent is selected for assisting the call (step 64). By the closely related matching, an appropriate expert agent for each call can be selected based on closely related matching, weighted criteria matching, or overall threshold matching. An expert agent can be chosen if each expert selection criteria, such as seniority, ranking, success rate of handling a particular subject matter, is most similar to one of the agent's personal data. For example, if a subject matter of a call from a caller is determined to be regarding billing, specifically a credit card, then an expert selection criteria would include, as a list, top 90% of an expert's ranking, two or more years of experience as an expert agent, and 90% of a success rate of handling credit card related issues as the credit card issues are complicated. Then, an expert agent who has personal data matching closely related to the list of the expert selection criteria, for instance, the expert who has 85% of the expert ranking, three years of experience, and 90% of success rate will be selected instead of the other expert agent who has personal data of 90% of ranking, a half year of experience, and 90% of success rate. Other examples of the closely related matching are possible. The weighted criteria matching can be used to select an appropriate expert whose personal data matches to highly weighted criteria in the expert selection criteria, such as language skills. Thus, a call analyzer determines that a caller is having difficulty communicating in English, the language skill is more highly weighted than the seniority or the success rate in the expert selection criteria. Other examples of the weighted criteria matching are possible. In addition, an expert agent can be selected by the overall threshold matching of the agent personal data with the expert selection criteria, such as satisfying a threshold level of match specified in the agent selection criteria. For example, an expert agent who has 80% of overall match with the agent selection criteria can be selected. Other examples of the overall threshold matching are possible. If an expert agent who matches with the agent selection criteria is found, then the expert agent is selected for intervention (step 64). If no matching to the agent selection criteria is found, the steps 61-64 can be repeated with some modifications in matching criteria. In one embodiment, matching of the expert selection criteria may be limited to a list of expert agents who have expertise in the subject matter of the call between the agent and the caller which is initially identified. In another embodiment, matching similarity or threshold can be lowered to obtain further matches. Other types of modification are possible.

Expert Intervention

Figure 6:
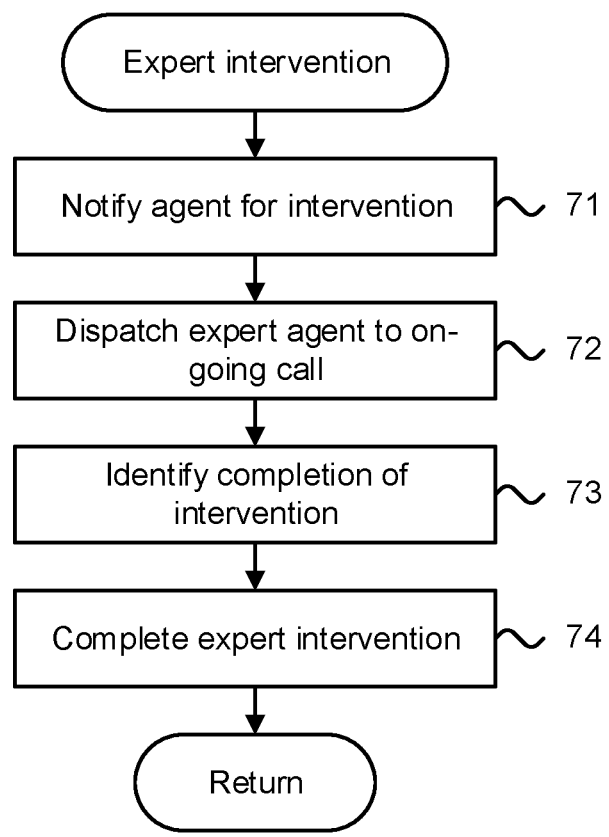
FIG. 6 is a flow diagram showing, by way of example, a method for managing expert intervention.

Actual intervention by an expert agent in an on-going conversation between an agent and caller occurs by dispatching the expert agent to the on-going call in addition to or in lieu of the agent who is initially handling the call conversation with the caller. FIG. 6 is a flow diagram showing, by way of example, a method 70 for managing expert intervention. Once an expert agent is selected from a list of experts, the agent is notified that the selected expert agent is patched into the call between her and the caller (step 71). The notification can be transmitted by a telephone call, text message, email, and real-time messaging (chat). Other forms of notification are possible. In one embodiment, the selected expert agent is also notified that she will be dispatched to the on-going call.

The notified expert agent is patched into the on-going call (step 72) without putting the call on hold or opening a new line to begin a conference. Patching through the expert agent into the on-going call may be implemented by replacing the agent currently on the call with the expert agent or adding the expert agent into the call. For example, when the agent and the caller are communicating by a telephone, the expert agent intervention may be implemented by using the same phone line as the current phone line of the call between the agent and the caller. Once connected, the agent and the caller can talk with the expert agent or the expert agent can provide whispers to the agent. As another example, when the agent and the caller are communicating by instant messaging, the expert agent may be integrated into the instant message communication between the agent and the caller. Other forms of dispatch are possible.

Once the expert intervention has joined, recording of the call continues between the expert agent and the caller. A completion of the conversation between the expert agent and the caller can be identified by notification sent by the expert agent (step 73). In another embodiment, the recording of the conversation between the expert agent and the caller can be analyzed to determine whether the conversation between the expert agent and the caller is completed, as described supra with reference to FIG. 4. For example, identifying affirmative words, such as "yes," "thank you," or "that was helpful" may be considered as the completion of the conversation between the expert agent and the caller. Then, the expert agent is detached, or removed from the on-going conversation (step 74). The detachment may result in the end of communication with the caller or a transfer of the call to the original agent, another agent, or another expert agent. The expert agent who was on the conversation is now available for participation in a further call.

While the invention has been particularly shown and described as referenced to the embodiments thereof, those skilled in the art will understand that the foregoing and other changes in form and detail may be made therein without departing from the spirit and scope.

What is claimed is:

1. A system for providing ongoing call center call assistance with the aid of a digital computer, comprising steps of:
   a receipt module to receive a call from a caller;
   a connection module to connect the caller to an agent of the call center;
   a monitoring module to monitor the agent's speech during the call;
   a determination module to determine characteristics of the agent's speech during the call;
   a characteristic module to obtain predetermined speech characteristics for the agent;
   a comparison module to compare the speech characteristics determined during the call to the predetermined speech characteristics for the agent;
   a detection module to detect the agent being in need of assistance based on the comparison;
   a subject matter module to determine a subject matter of the call;

an expert module to identify one of plurality of experts whose expertise matches the subject matter of the call; and a connection module to patch the expert into the call; and at least one processor to execute the modules.

2. A system according to claim 1, further comprising at least one of:

a speech recognition module to perform speech recognition on the monitored call;

a word module to identify one or more characteristic words associated with the subject matter based on the performed speech recognition, wherein the subject matter is identified based on the identified words.

3. A system according to claim 1, further comprising:

a notification module to, prior to patching the expert into the conversation, notifying the expert regarding the expert being dispatched into the conversation.

4. A system according to claim 1, wherein the call is conducted via a phone line and the expert is patched into the call using the same phone line.

5. A system according to claim 4, wherein the predetermined speech characteristics and the speech characteristics determined during the call comprise one or more of a speed, loudness, intensity of an overtone, and a length of a pause the agent's speech.

6. A system according to claim 1, further comprising:

a script module to interact caller based on a plurality of scripts;

a response module to receive a plurality of responses from the caller during the interaction, wherein the subject matter of the call is determined based on the responses.

7. A system according to claim 1, further comprising:

a recording module to record the call and to continuously store the recording in a database, wherein the monitoring comprises analyzing the stored recording.

8. A system according to claim 1, further comprising:

an expert selection criteria module to obtain a plurality of expert selection criteria;

an information module to obtain information regarding the caller;

a weight module to weigh the expert selection criteria based on the caller information; and a selection module to select the expert using on the weighed criteria.

9. A system according to claim 1, further comprising:

an agent selection criteria module to obtain selection criteria;

an agent selection module to select the agent using the criteria; and an expert selection module to select the expert by the intervention processor using the agent selection criteria.

10. A system according to claim 1, further comprising:

an update module to update the subject matter of the call based on the monitoring.

11. A method for providing ongoing call center call assistance with the aid of a digital computer, comprising steps of:

receiving by an automatic call distributor in a call center a call from a caller and connecting by the automatic call distributor the caller to an agent of the call center;

monitoring by an intervention processor comprised in the call center the agent's speech during the call;

determining by the intervention processor characteristics of the agent's speech during the call;

obtaining by the intervention processor predetermined speech characteristics for the agent;

comparing by the intervention processor the speech characteristics determined during the call to the predetermined speech characteristics for the agent;

detecting by the intervention processor the agent being in need of assistance based on the comparison;

determining by the automatic call distributor a subject matter of the call;

identifying by the intervention processor one of plurality of experts whose expertise matches the subject matter of the call; and patching by the intervention processor the expert into the call.

12. A method according to claim 11, further comprising at least one of:

performing by the automatic call distributor speech recognition on the monitored call;

identifying by the automatic call distributor one or more characteristic words associated with the subject matter based on the performed speech recognition, wherein the subject matter is identified based on the identified words.

13. A method according to claim 11, further comprising:

prior to patching the expert into the conversation, notifying the expert regarding the expert being dispatched into the conversation.

14. A method according to claim 11, wherein the call is conducted via a phone line and the expert is patched into the call using the same phone line.

15. A method according to claim 14, wherein the predetermined speech characteristics and the speech characteristics determined during the call comprise one or more of a speed, loudness, intensity of an overtone, and a length of a pause the agent's speech.

16. A method according to claim 11, further comprising:

interacting by the automatic call distributor with the caller based on a plurality of scripts;

receiving by the automatic call distributor a plurality of responses from the caller during the interaction, wherein the subject matter of the call is determined based on the responses.

17. A method according to claim 11, further comprising:

recording by the automatic call distributor the call and continuously storing by the automatic call distributor the recording in a database, wherein the intervention processor is interconnected to the database and the monitoring comprises analyzing the stored recording.

18. A method according to claim 11, further comprising:

obtaining by the intervention processor a plurality of expert selection criteria;

obtaining by the intervention processor information regarding the caller;

weighing by the intervention processor the expert selection criteria based on the caller information; and selecting the expert using on the weighed criteria.

19. A method according to claim 11, further comprising:

obtaining by the automated call distributor agent selection criteria;

selecting by the automatic call distributor the agent using the criteria; and selecting the expert by the intervention processor using the agent selection criteria.

20. A non-transitory computer readable storage medium storing code for executing on a computer system to perform the method steps according to claim 11.

* * * * *